(12) United States Patent
Park et al.

(10) Patent No.: US 11,906,773 B2
(45) Date of Patent: Feb. 20, 2024

(54) DIFFRACTION LIGHT GUIDE PLATE AND DISPLAY DEVICE INCLUDING THE SAME

(71) Applicant: LG CHEM, LTD., Seoul (KR)

(72) Inventors: Seong Min Park, Daejeon (KR); Jeong Ho Park, Daejeon (KR); Sang Choll Han, Daejeon (KR); Bu Gon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 891 days.

(21) Appl. No.: 16/961,755

(22) PCT Filed: Aug. 21, 2019

(86) PCT No.: PCT/KR2019/010609
§ 371 (c)(1),
(2) Date: Jul. 13, 2020

(87) PCT Pub. No.: WO2020/040535
PCT Pub. Date: Feb. 27, 2020

(65) Prior Publication Data
US 2021/0063627 A1    Mar. 4, 2021

(30) Foreign Application Priority Data

Aug. 22, 2018   (KR) ........................ 10-2018-0097889

(51) Int. Cl.
*G02B 27/01* (2006.01)
*F21V 8/00* (2006.01)
*G02B 5/18* (2006.01)

(52) U.S. Cl.
CPC ......... *G02B 6/0023* (2013.01); *G02B 5/1842* (2013.01); *G02B 6/005* (2013.01)

(58) Field of Classification Search
CPC .... G02B 6/0023; G02B 5/1842; G02B 6/005; G02B 5/1819
(Continued)

(56) References Cited

U.S. PATENT DOCUMENTS

| 10,359,635 B2 | 7/2019 | Grey et al. |
| 2006/0132914 A1 | 6/2006 | Weiss et al. |

(Continued)

FOREIGN PATENT DOCUMENTS

| JP | 2007219106 A | 8/2007 |
| JP | 2008523435 A | 7/2008 |

(Continued)

*Primary Examiner* — Audrey Y Chang
(74) *Attorney, Agent, or Firm* — Bryan Cave Leighton Paisner LLP (57) ABSTRACT

The present disclosure provides a diffraction light guide plate including: a light guide unit; an input diffraction optical element configured to diffract light which is outputted from a light source and inputted to the input diffraction optical element, to guide the inputted light on the light guide unit; and two diffraction optical elements configured to receive the diffracted light from the input diffraction optical element and one-dimensionally expand the received light by diffraction, wherein each of the two diffraction optical elements receives the expanded light from the other of the diffraction optical elements and outputs the received light from the light guide unit by the diffraction, and there is no region where the two diffraction optical elements overlap each other on the light guide unit.

6 Claims, 6 Drawing Sheets

(58) Field of Classification Search
USPC .......................................... 359/15, 34, 569
See application file for complete search history.

(56) References Cited

U.S. PATENT DOCUMENTS

| | | |
|---|---|---|
| 2010/0214659 A1 | 8/2010 | Levola |
| 2017/0299864 A1 | 10/2017 | Vallius et al. |
| 2017/0315346 A1 | 11/2017 | Tervo et al. |
| 2018/0172995 A1 | 6/2018 | Lee et al. |
| 2018/0210205 A1 | 7/2018 | Grey et al. |
| 2020/0088932 A1* | 3/2020 | Schultz ................. G02B 6/006 |

FOREIGN PATENT DOCUMENTS

| | | |
|---|---|---|
| KR | 1020160101104 A | 8/2016 |
| KR | 10-2017-0039655 A | 4/2017 |
| WO | 2018125574 A | 7/2018 |
| WO | 2020084275 A1 | 4/2020 |
| WO | 2020171666 A1 | 8/2020 |

* cited by examiner

DIFFRACTION LIGHT GUIDE PLATE AND DISPLAY DEVICE INCLUDING THE SAME

TECHNICAL FIELD

The present invention relates to a diffraction light guide plate and a display device including the diffraction light guide plate.

BACKGROUND ART

Recently, as interest in a display unit for implementing augmented reality (AR), mixed reality (MR), or virtual reality (VR) has increased, the display unit has been actively researched. The display unit for implementing augmented reality, mixed reality, or virtual reality includes a diffraction light guide plate that uses diffraction based on wave characteristics of light.

Figure 1:
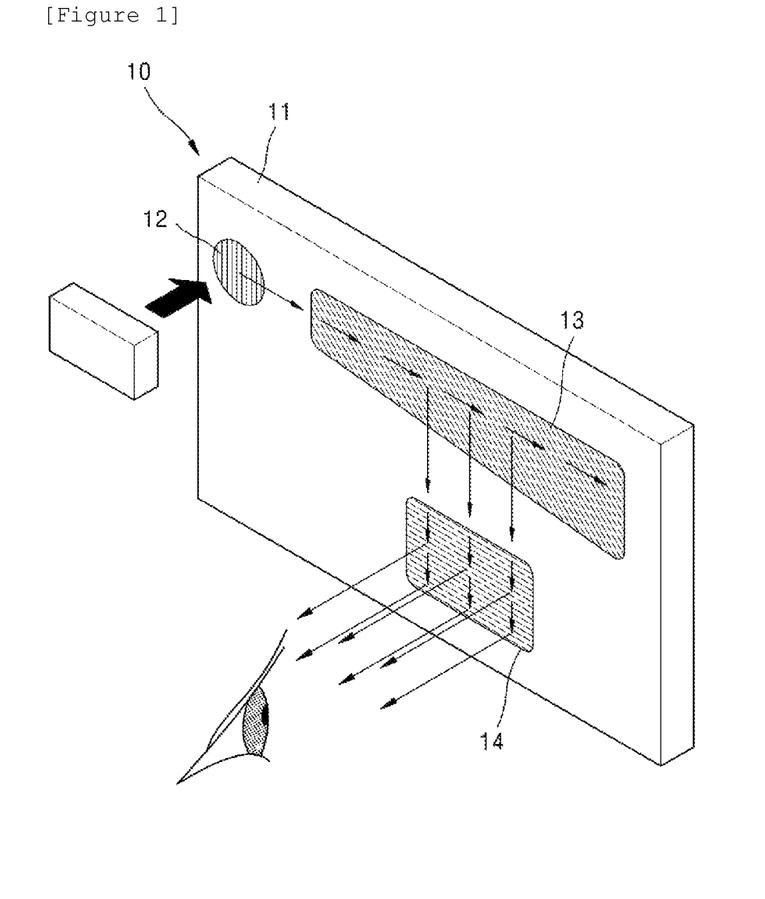
FIG. 1 is a view schematically illustrating a diffraction light guide plate in the related art.

FIG. 1 is a view schematically illustrating a diffraction light guide plate in the related art.

The diffraction light guide plate 10 may include a light guide unit 11, and multiple diffraction optical elements 12, 13, and 14 provided on one surface or the other surface of the light guide unit 11 and having multiple grating line patterns. Specifically, the diffraction light guide plate 10 may include the input diffraction optical element 12 which guides, to the light guide unit 11, the light outputted through a micro light output element P and inputted to the input diffraction optical element 12, the intermediate diffraction optical element 13 which is optically coupled to the input diffraction optical element 12 through the light guide unit 11 and one-dimensionally expands, in a first direction (x-axis direction in FIG. 1) by diffraction, the light received from the input diffraction optical element 12, and the output diffraction optical element 14 which is optically coupled to the intermediate diffraction optical element 13 through the light guide unit 11, one-dimensionally expands, in a second direction (y-axis direction in FIG. 1) by diffraction, the light received from the intermediate diffraction optical element 13, and allows the light to be outputted from the light guide unit 11 and directed toward a user's pupil.

The main optical path through which the light outputted through the micro light output element P reaches the user's pupil is defined in the order of the input diffraction optical element 12, the intermediate diffraction optical element 13, the output diffraction optical element 14, and the user's pupil, as a result of which a magnitude of an optical image outputted from the light guide unit 11 through the output diffraction optical element 14 depends on an area occupied by the output diffraction optical element 14.

Meanwhile, in the case of the diffraction light guide plate in the related art, since the single input diffraction optical element 12, the single intermediate diffraction optical element 13, and the single output diffraction optical element 14 are separately disposed on the light guide unit 11, the area occupied by the output diffraction optical element 14 on the light guide unit 11 is inevitably limited to an area of the light guide unit 11 other than an area occupied by the input diffraction optical element 12 and the intermediate diffraction optical element 13, and as a result, there is a limitation in outputting a larger optical image.

The above-mentioned background art is technical information that the inventors have retained to derive exemplary embodiments of the present invention or have obtained in the course of deriving the exemplary embodiments of the present invention, and cannot be thus said to be technical information publicly known to the public before filing the invention.

DETAILED DESCRIPTION OF THE INVENTION

Technical Problem

The present invention has been made in an effort to provide a diffraction light guide plate capable of forming image light with a larger viewing angle, and a display device including the diffraction light guide plate.

However, technical problems to be solved by the present invention are not limited to the above-mentioned technical problems, and other technical problems, which are not mentioned above, may be clearly understood by those skilled in the art from the following descriptions.

Technical Solution

An exemplary embodiment according to one aspect of the present invention provides a diffraction light guide plate including: a light guide unit configured to guide light; an input diffraction optical element configured to diffract light, which is outputted from a light source and inputted to the input diffraction optical element, so as to guide the inputted light on the light guide unit; and two diffraction optical elements configured to receive the diffracted light from the input diffraction optical element and one-dimensionally expand the received light by the diffraction, wherein each of the two diffraction optical elements receives the expanded light from the other diffraction optical element and outputs the received light from the light guide unit by the diffraction, and there is no region where the two diffraction optical elements overlap each other on the light guide unit.

In the present exemplary embodiment, the diffraction optical elements may include linear gratings repeatedly formed at predetermined pitches, respectively, and have grating vectors defined as having magnitudes inversely proportional to the pitches of the linear gratings and directions perpendicular to directions in which the linear gratings extend, and a sum of the magnitudes of the grating vectors of the input diffraction optical element and the two diffraction optical elements may be 0.

In the present exemplary embodiment, the grating vectors of the input diffraction optical element and the two diffraction optical elements may have the same magnitude.

In the present exemplary embodiment, the grating vectors of the input diffraction optical element and the two diffraction optical elements may form an angle of 60° with respect to one another.

In the present exemplary embodiment, the two diffraction optical elements may be provided on the same plane on the light guide unit.

In the present exemplary embodiment, a light receiving side of one of the two diffraction optical elements, which receives the expanded light from the other of the diffraction optical elements, may adjoin a light receiving side of the other of the diffraction optical elements.

In the present exemplary embodiment, a region where the light receiving sides of the two diffraction optical elements adjoin may have no physical boundary line.

An exemplary embodiment according to another aspect of the present invention provides a display device including: a light source configured to output image light which forms an image; and the diffraction light guide plate according to one aspect of the present invention.

Advantageous Effects

According to the exemplary embodiment of the present invention, the image light expanded by the two diffraction optical elements is outputted from the light guide unit, such that the image light with a larger viewing angle may be formed in comparison with the case in which the image light is outputted from the light guide unit only by the single diffraction optical element.

In addition, because there is no region where the two diffraction optical elements overlap each other on the light guide unit, it is possible to prevent the intended total reflection path from being excessively distorted.

MODE FOR INVENTION

The present invention will be apparent with reference to exemplary embodiments to be described below in detail together with the accompanying drawings. However, the present invention is not limited to the exemplary embodiments disclosed herein but will be implemented in various forms. The exemplary embodiments of the present invention are provided so that the present invention is completely disclosed, and a person with ordinary skill in the art can fully understand the scope of the present invention. The present invention will be defined only by the scope of the appended claims. Meanwhile, the terms used in the present specification are for explaining the exemplary embodiments, not for limiting the present invention. Unless particularly stated otherwise in the present specification, a singular form also includes a plural form. The terms such as "comprises (includes)" and/or "comprising (including)" used in the specification do not exclude presence or addition of one or more other constituent elements, steps, operations, and/or elements, in addition to the mentioned constituent elements, steps, operations, and/or elements. The terms such as "first" and "second" may be used to describe various constituent elements, but the constituent elements should not be limited by the terms. These terms are used only to distinguish one constituent element from another constituent element.

In the present specification, the term "light guide unit" may be defined as a structure that guides light therein by using total internal reflection. According to a condition for the total internal reflection, a refractive index of a light guide unit needs to be larger than a refractive index of a peripheral medium adjacent to a surface of the light guide unit. The light guide unit may be made of a material including glass and/or plastic and may be transparent or semi-transparent. The light guide unit may be of a plate type and may have various layouts. Here, the term "plate" means a three-dimensional structure having a predetermined thickness between one surface and the other surface opposite to the one surface, and the one surface and the other surface may be substantially flat surfaces, but at least one of the one surface and the other surface may be one-dimensionally or two-dimensionally curved. For example, the plate type light guide unit is one-dimensionally curved, such that one surface and/or the other surface thereof may have a shape corresponding to a part of a lateral side of a cylindrical shape. However, a curvature of the curved shape may have a sufficiently large radius of curvature to facilitate the total internal reflection for guiding the light on the light guide unit.

In the present specification, the term "diffraction optical element" may be defined as a structure for changing an optical path by diffracting the light on the light guide unit. Here, the term "diffraction optical element" may mean a portion where multiple grating lines oriented in one direction on the light guide unit are arranged in a predetermined direction to have a pattern and form a predetermined area.

In the present specification, the term "grating line" may mean a protrusion shape (i.e., an embossed pattern) having a predetermined height on the surface of the light guide unit and/or a groove shape (i.e., a debossed pattern) having a predetermined depth on the surface of the light guide unit. Here, the orientation direction of the grating lines may be freely designed so that the optical path may be changed to an intended direction by means of the diffraction by the diffraction optical element.

Figure 2:
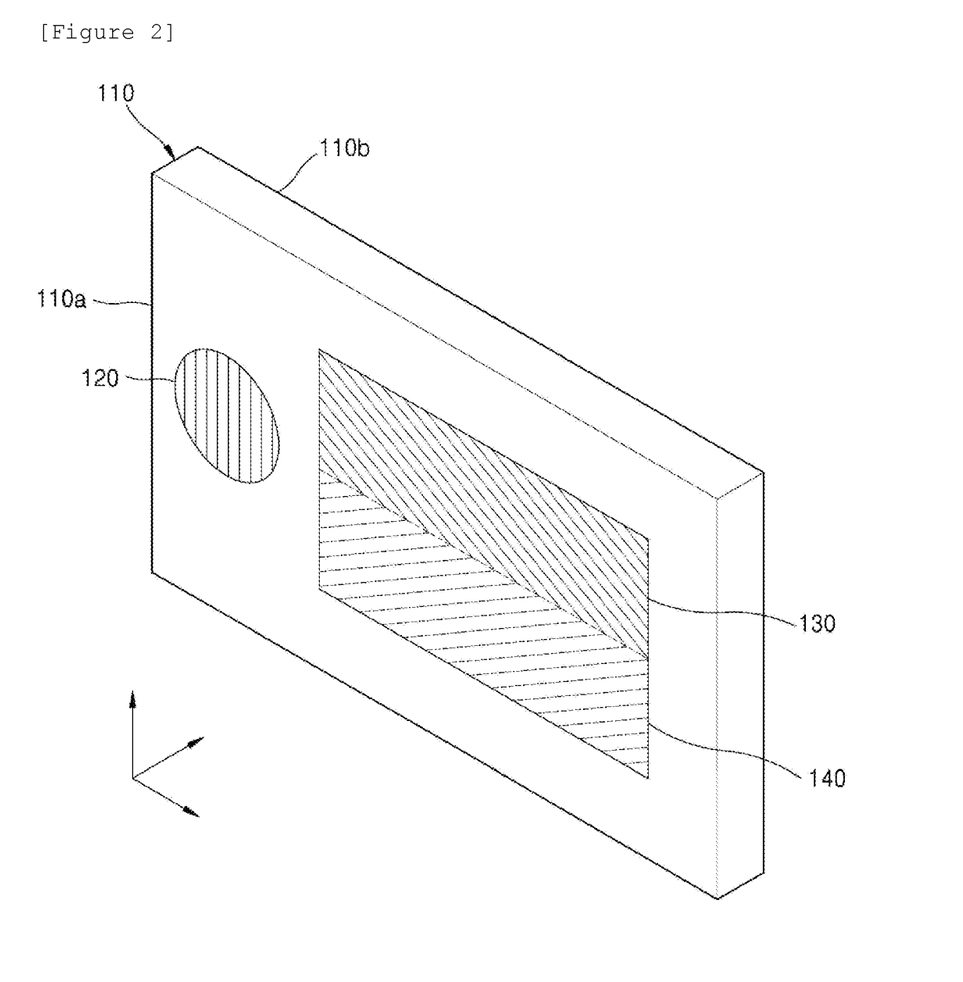
FIG. 2 is a view schematically illustrating a diffraction light guide plate according to one aspect of the present invention.
Figure 3A:
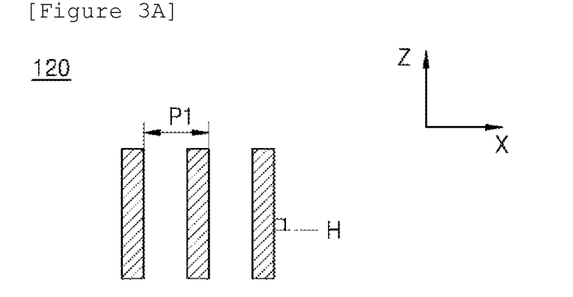
FIGS. 3A to 3C are top plan views of gratings included in several diffraction optical elements of the diffraction light guide plate illustrated in FIG. 2.
Figure 3B:
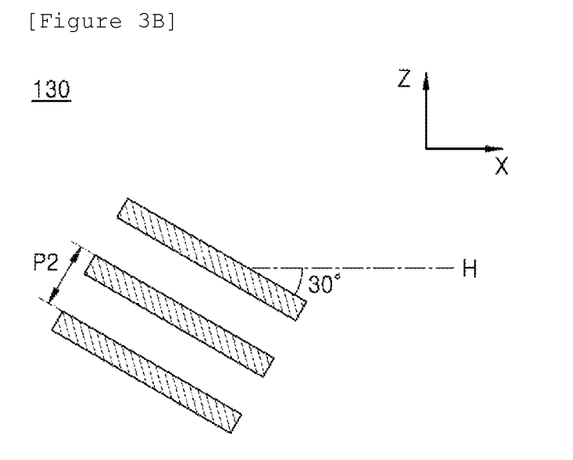
Figure 3C:
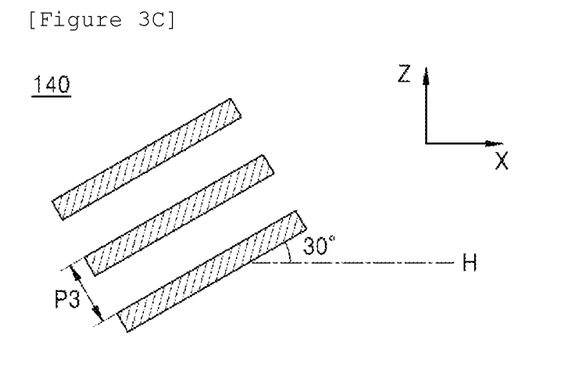
Figure 4:
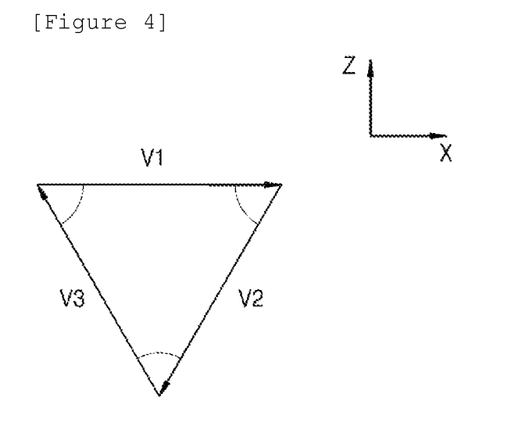
FIG. 4 is a view illustrating a combination of grating vectors included in the several diffraction optical elements of the diffraction light guide plate illustrated in FIG. 2.

FIG. 2 is a view schematically illustrating a diffraction light guide plate according to one aspect of the present invention, FIGS. 3A to 3C are top plan views of gratings included in several diffraction optical elements of the diffraction light guide plate illustrated in FIG. 2, and FIG. 4 is a view illustrating a combination of grating vectors included in the several diffraction optical elements of the diffraction light guide plate illustrated in FIG. 2.

Figure 5A:
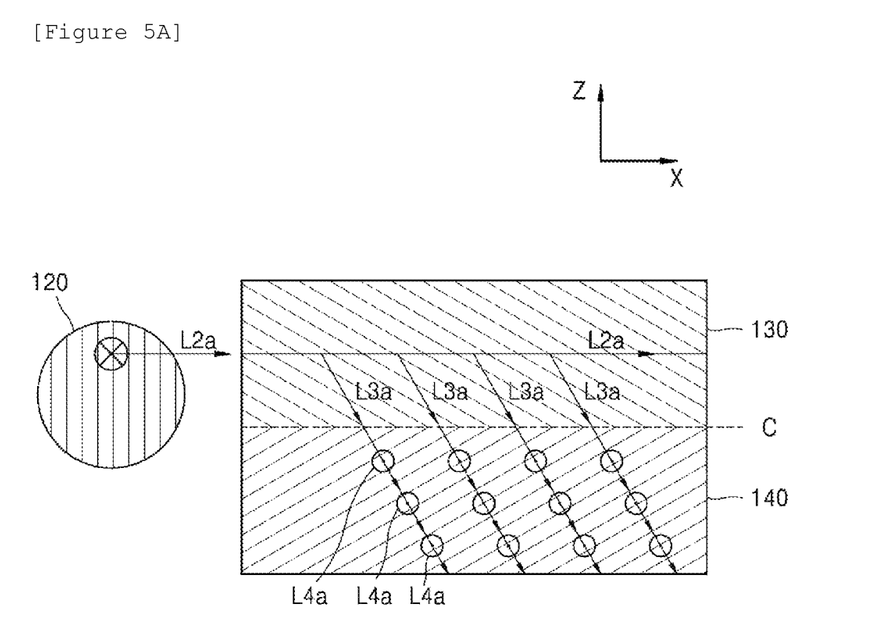
FIG. 5A is a top plan view schematically illustrating an example of an optical path running through the diffraction light guide plate illustrated in FIG. 2.
Figure 5B:
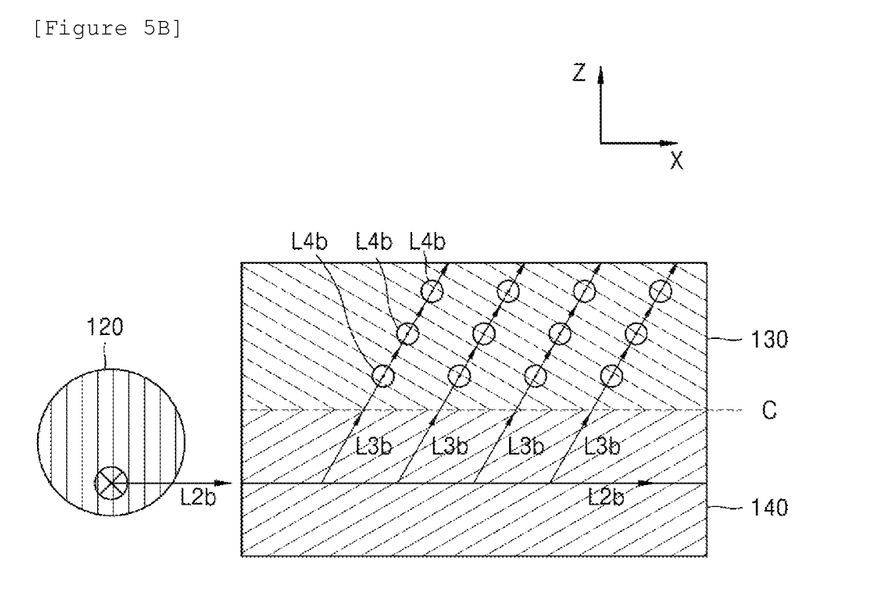
FIG. 5B is a top plan view schematically illustrating another example of the optical path running through the diffraction light guide plate illustrated in FIG. 2.

FIG. 5A is a top plan view schematically illustrating an example of an optical path running through the diffraction light guide plate illustrated in FIG. 2, and FIG. 5B is a top plan view schematically illustrating another example of the optical path running through the diffraction light guide plate illustrated in FIG. 2.

Referring to FIGS. 2 to 6, a diffraction light guide plate may include a light guide unit 110, an input diffraction optical element 120, and two diffraction optical elements 130 and 140.

The light guide unit 110 may guide light therein by using total internal reflection.

Light beams outputted from a light source are inputted to the input diffraction optical element 120, and the input diffraction optical element 120 may diffract the inputted light beams to guide the light beams on the light guide unit 110.

The input diffraction optical element 120 may be disposed at one side of one surface 110a of the light guide unit 110 (e.g., at the left side in FIG. 2).

The two diffraction optical elements 130 and 140 may be configured to receive the diffracted light beams L2a and L2b and one-dimensionally expand the received light beams by diffraction. A part of the diffracted light beams L2a and L2b received from the input diffraction optical element 120 is diffracted while passing through the diffraction optical elements 130 and 140, such that the optical path is changed, and the remaining part of the light beams may be totally reflected to the previous optical path. The light beams initially received from the input diffraction optical element 120 are diffracted several times at points spaced apart from one another in a predetermined direction and divided into multiple beams L3a and L3b, as a result of which the one-dimensional expansion is implemented.

The two diffraction optical elements 130 and 140 may be configured to receive the expanded light beam L3b or L3a from the other of the diffraction optical elements 140 and 130 and output the received light beam L3b or L3a from the light guide unit 110 by the diffraction, respectively. Meanwhile, each of the two diffraction optical elements 130 and 140 may also receive the expanded light beam L3b or L3a from the other of the diffraction optical elements 140 and 130 and one-dimensionally expand the received light beam by the diffraction. In this case, based on light receiving sides C of the two diffraction optical elements 130 and 140, a direction in which the multiple beams L3b and L3a formed by the light beam expanded by the other of the diffraction optical elements 140 and 130 are spaced apart from one another intersect a direction in which multiple beams L4b and L4a expanded by the two diffraction optical elements 130 and 140 are spaced apart from one another based on the single beam L3b or L3a, as a result of which two-dimensional expansion is implemented based on light beams received by the input diffraction optical element 120 from the light source.

There may be no region where the two diffraction optical elements 130 and 140 overlap each other on the light guide unit 110. In the case of the light beam that is diffracted on one diffraction optical element and totally reflected and travels toward the other diffraction optical element, an intended total reflection path of the light beam may be slightly distorted each time the light beam meets spaced grating line patterns on the diffraction optical element. Therefore, the two diffraction optical elements 130 and 140 are disposed in separate regions based on the top plan view of the light guide unit 110 so that one and the other of the diffraction optical elements 140 and 130 do not overlap each other, and as a result, it is possible to prevent one diffraction optical element from excessively occupying the area of the other diffraction optical element and thus to prevent the intended total reflection path from being excessively distorted.

The diffraction optical elements 120, 130, and 140 may include linear gratings, respectively, which are repeatedly formed at predetermined pitches P1, P2, and P3. The linear grating may be in the form of a protruding protrusion.

The diffraction optical elements 120, 130, and 140 may have grating vectors V1, V2, and V3 defined as having 'magnitudes' inversely proportional to the pitches P1, P2, and P3 of the linear gratings and 'directions' perpendicular to the directions in which the linear gratings extend. The magnitude of each of the grating vectors V1, V2, and V3 may be defined by means of the following Equation 1.

$$|V| = \frac{2\pi}{P}$$ [Equation 1]

Here, |V| means the magnitude of a grating vector of the diffraction optical element, and P means the pitch of the linear grating of the diffraction optical element.

A sum of the magnitudes of the grating vectors V1, V2, and V3 of the input diffraction optical element 120 and the two diffraction optical elements 130 and 140 is 0.

In this case, the grating vectors V1, V2, and V3 of the input diffraction optical element 120 and the two diffraction optical elements 130 and 140 have the same magnitude, and the grating vectors V1, V2, and V3 of the input diffraction optical element 120 and the two diffraction optical elements 130 and 140 may form an angle of 60° with respect to one another. The reason is that all of the diffraction optical elements 120, 130, and 140 may be formed by a single mold having grating patterns with the same pitch.

As an exemplary embodiment, as illustrated in FIG. 3A, the input diffraction optical element 120 has a linear grating forming an angle of 90° with respect to a horizontal line H parallel to an x axis. As illustrated in FIG. 3B, the diffraction optical element 130 of the two diffraction optical elements 130 and 140, which is positioned at an upper side based on an imaginary division line C, has a linear grating forming an angle of −30° with respect to the horizontal line H parallel to the x-axis. As illustrated in FIG. 3C, the diffraction optical element 140 positioned at a lower side based on the imaginary division line C may have a linear grating forming an angle of +30° with respect to the horizontal line H parallel to the x-axis. The pitches P1, P2, and P3 of the linear gratings are equal to one another, such that the grating vectors V1, V2, and V3 of the diffraction optical elements 120, 130, and 140 have the same magnitude. Since the directions of the grating vectors V1, V2, and V3 are perpendicular to the directions in which the linear gratings extend, the direction of the grating vector V1 of the input diffraction optical element 120 may be parallel to the x-axis direction, the direction of the grating vector V2 of the diffraction optical element 130 positioned at the upper side based on the division line C may form an angle of −120° with respect to the x-axis direction, and the direction of the grating vector V3 of the diffraction optical element 140 positioned at the lower side based on the division line C may form an angle of +120° with respect to the x-axis direction. In this way, the grating vectors V1, V2, and V3 of the input diffraction optical element 120 and the two diffraction optical elements 130 and 140 form an angle of 60° with respect to one another, such that a sum of the magnitudes of the grating vectors V1, V2, and V3 is 0.

The two diffraction optical elements 130 and 140 may be provided on the same plane on the light guide unit 110. According to the exemplary embodiment of the present invention, the two diffraction optical elements 130 and 140 are provided on one surface 110a of the light guide unit 110. Since there is no region where the two diffraction optical elements 130 and 140 overlap each other on the same plane on the light guide unit 110, the linear gratings of the two diffraction optical elements 130 and 140 may be formed at once during the process of manufacturing the two diffraction optical elements 130 and 140, by providing all the grating patterns for forming the linear gratings of the two diffraction optical elements 130 and 140 in a single mold.

A light receiving side C of each of the two diffraction optical elements 130 and 140, which receives the expanded light beam L3b or L3a from the other of the diffraction optical elements 140 and 130, may adjoin a light receiving side C of the other of the diffraction optical elements 140 and 130. The light beams outputted from the light source are outputted from the light guide unit 110 via the input diffraction optical element 120—the two diffraction optical elements 130 and 140—the other of the diffraction optical elements 140 and 130, and the light beams outputted from the light guide unit 110 in this manner are collected by the other of the diffraction optical elements 140 and 130 to form a single image light beam. Therefore, the reason is that the light receiving side C of each of the two diffraction optical elements 130 and 140, which receives the expanded light beam L3b or L3a from the other of the diffraction optical elements 140 and 130, needs to adjoin the light receiving side C of the other of the diffraction optical elements 140 and 130 to prevent the image light from being separated.

Figure 6:
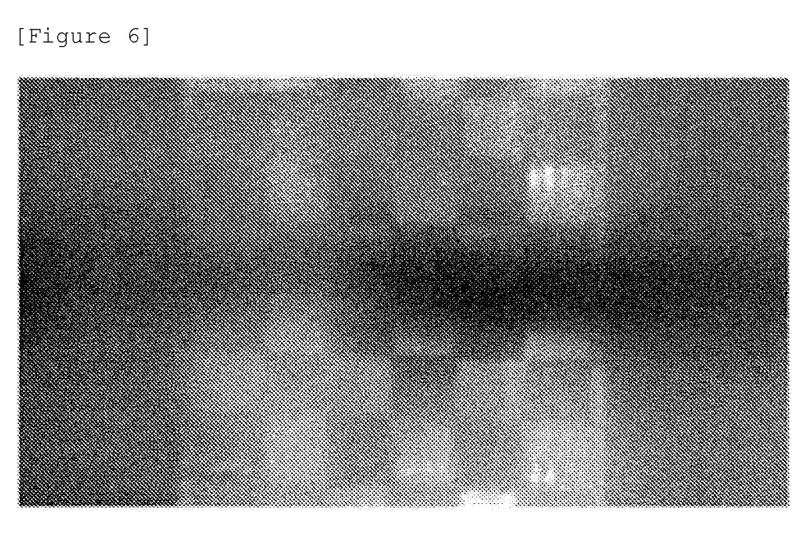
FIG. 6 is a view illustrating a result of outputting image light through the diffraction light guide plate having a physical boundary line formed in a region where light receiving sides of the two diffraction optical elements adjoin.

In particular, there may be no physical boundary line in the region C where the light receiving sides of the two diffraction optical elements 130 and 140 adjoin. Even though there is the region C where the light receiving sides adjoin, the physical boundary line may be formed in the case in which the two diffraction optical elements 130 and 140 are formed by different molds. In this case, as illustrated in FIG. 6, image quality may deteriorate as a middle end of the image light appears dark.

A display device (not illustrated) according to another aspect of the present invention may include a light source (not illustrated) configured to output image light for forming an image, and the diffraction light guide plate according to one aspect of the present invention. The image light outputted from the light source is inputted to and diffracted by the input diffraction optical element 120 and coupled to the two diffraction optical elements 130 and 140, the two diffraction optical elements 130 and 140 are coupled to diffract the received light to one-dimensionally expand the received light, and the one-dimensionally expanded light is coupled to the other of the diffraction optical elements 140 and 130 and may be outputted from the light guide unit 110 by the diffraction. Since the image light expanded by the two diffraction optical elements 130 and 140 is outputted from the light guide unit 110, it is possible to form the image light with a larger viewing angle in comparison with the case in which the image light is outputted from the light guide unit 110 only by the single diffraction optical element.

While the present invention has been described with reference to the aforementioned exemplary embodiments, various modifications or alterations may be made without departing from the subject matter and the scope of the invention. Accordingly, the appended claims include the modifications or alterations as long as the modifications or alterations fall within the subject matter of the present invention.

The invention claimed is:

1. A diffraction light guide plate comprising:
a light guide unit configured to guide light;
an input diffraction optical element configured to diffract light, which is outputted from a light source and inputted to the input diffraction optical element, so as to guide the inputted light on the light guide unit; and
two diffraction optical elements configured to receive the diffracted light from the input diffraction optical element and one-dimensionally expand the received light by diffraction,
wherein each of the two diffraction optical elements receives the expanded light from the other of the diffraction optical elements and outputs the received light from the light guide unit by diffraction, and there is no region where the two diffraction optical elements overlap each other on the light guide unit,
wherein each of the input diffraction optical element and the two diffraction optical elements includes linear gratings repeatedly formed at predetermined pitches, and has grating vectors defined as having magnitudes inversely proportional to the pitches of the linear gratings and directions perpendicular to directions in which the linear gratings are orientated, and the sum of the grating vectors of the input diffraction optical element and the two diffraction optical elements is 0, and
wherein the grating vectors of the input diffraction optical element and those of the two diffraction optical elements have the same magnitude.

2. The diffraction light guide plate of claim 1, wherein the grating vectors of the input diffraction optical element and those of the two diffraction optical elements form an angle of 60° with respect to one another.

3. The diffraction light guide plate of claim 1, wherein the two diffraction optical elements are provided on the same plane on the light guide unit.

4. The diffraction light guide plate of claim 1, wherein a light receiving side of one of the two diffraction optical elements, which receives the expanded light from the other of the diffraction optical elements, is adjoined to a light receiving side of the other diffraction optical element.

5. The diffraction light guide plate of claim 4, wherein the two diffraction optical elements are a unitary diffraction optical element.

6. A display device comprising:
a light source configured to output image light which forms an image; and
the diffraction light guide plate according to a claim 1.

* * * * *